US011290781B2

(12) United States Patent
Zhao et al.

(10) Patent No.: US 11,290,781 B2
(45) Date of Patent: *Mar. 29, 2022

(54) METHOD AND APPARATUS FOR OBTAINING RECORDED MEDIA CONTENT

(71) Applicant: AT&T Intellectual Property I, L.P., Atlanta, GA (US)

(72) Inventors: Yongdong Zhao, Pleasanton, CA (US); Baofeng Jiang, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/934,662

(22) Filed: Jul. 21, 2020

(65) Prior Publication Data

US 2020/0351556 A1   Nov. 5, 2020

Related U.S. Application Data

(63) Continuation of application No. 15/436,348, filed on Feb. 17, 2017, now Pat. No. 10,771,850.

(51) Int. Cl.
| | | |
|---|---|---|
| H04N 21/4627 | (2011.01) | |
| H04N 21/475 | (2011.01) | |
| H04N 21/4147 | (2011.01) | |
| H04N 21/437 | (2011.01) | |
| H04N 21/472 | (2011.01) | |
| H04N 21/414 | (2011.01) | |
| H04N 21/482 | (2011.01) | |

(52) U.S. Cl.
CPC ..... *H04N 21/4627* (2013.01); *H04N 21/4147* (2013.01); *H04N 21/41407* (2013.01); *H04N 21/437* (2013.01); *H04N 21/475* (2013.01); *H04N 21/47202* (2013.01); *H04N 21/4826* (2013.01)

(58) Field of Classification Search
None
See application file for complete search history.

(56) References Cited

U.S. PATENT DOCUMENTS

| | | | |
|---|---|---|---|
| 7,812,854 | B1 | 10/2010 | Delker et al. |
| 8,078,696 | B2 | 12/2011 | LaJoie et al. |
| 8,181,206 | B2 | 5/2012 | Hasek |
| 8,290,156 | B2 | 10/2012 | Johnson et al. |
| 8,555,332 | B2 | 10/2013 | Banner et al. |
| 8,761,392 | B2 | 6/2014 | Chen et al. |
| 8,978,066 | B2 | 3/2015 | Rozensztejn et al. |
| 9,479,804 | B2 | 10/2016 | Mehta et al. |

(Continued)

*Primary Examiner* — Justin E Shepard
(74) *Attorney, Agent, or Firm* — Guntin & Gust, PLC; Jay Anderson

(57) ABSTRACT

Aspects of the subject disclosure may include, for example, a method in which an end user device sends a first request to a digital video recorder (DVR) to receive a media content item, and receives a metadata file including authentication information and a network address of a media content server where the media content item is located. The end user device sends a second request to the media content server to receive the media content item; the second request is sent to the network address and includes the authentication information and an identification of the requested media content item. The end user device receives the media content item from the media content server, responsive to the authentication information and the identification of the media content item sent in the second request. Other embodiments are disclosed.

20 Claims, 7 Drawing Sheets

(56) References Cited

U.S. PATENT DOCUMENTS

| | | |
|---|---|---|
| 2002/0143976 A1 | 10/2002 | Barker et al. |
| 2008/0059409 A1 | 3/2008 | Montpetit et al. |
| 2009/0052863 A1 | 2/2009 | Parmar et al. |
| 2009/0293093 A1 | 11/2009 | Igarashi |
| 2010/0192183 A1 | 7/2010 | Hu et al. |
| 2011/0197264 A1 | 8/2011 | McDade et al. |
| 2012/0096121 A1 | 4/2012 | Hao et al. |
| 2012/0242526 A1 | 9/2012 | Perez et al. |
| 2013/0347025 A1 | 12/2013 | Prakash et al. |
| 2014/0164760 A1 | 6/2014 | Hybertson |
| 2014/0282767 A1 | 9/2014 | Tirpak et al. |
| 2015/0379559 A1 | 12/2015 | Saxena et al. |
| 2016/0300071 A1 | 10/2016 | Zhou et al. |
| 2018/0242044 A1 | 8/2018 | Zhao et al. |

100

METHOD AND APPARATUS FOR OBTAINING RECORDED MEDIA CONTENT

CROSS-REFERENCE TO RELATED APPLICATIONS

This application is a continuation of U.S. application Ser. No. 15/436,348, filed on Feb. 17, 2017, which is incorporated herein by reference in its entirety.

FIELD OF THE DISCLOSURE

The subject disclosure relates to a method, apparatus and storage medium including instructions for receiving from a media content server a media content item that had been recorded by a digital video recorder (DVR).

BACKGROUND

An end user device can request that a DVR send to the end user device media content. The quality of the media content received by the end user device is typically constrained by an upload bandwidth capability of the DVR.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for providing a user remote access to media content recorded by a DVR. Other embodiments are described in the subject disclosure.

In one specific example, the DVR is part of or integrated with a set top box (STB) used at a residence (e.g., home) of a user. In another specific example, the access to media content is provided to the user via use of an end user device (which may be a communication device such as a smartphone or tablet).

One or more aspects of the subject disclosure include a DVR that: (a) receives from an end user device a request for a media content item (e.g., a video); and (b) responsive to the request, sends back to the end user device: (i) a network address (or other type of pointer) of a media content server from which the requested media content item can be obtained; and (ii) authentication information associated with the DVR, authentication information associated with a service subscriber and/or authentication information associated with the requested media content item.

One or more aspects of the subject disclosure include an end user device that: (a) sends to a DVR a request for a media content item (e.g., a video); and (b) receives back from the DVR: (i) a network address (or other type of pointer) of a media content server from which the requested media content item can be obtained; and (ii) authentication information associated with the DVR, authentication information associated with a service subscriber and/or authentication information associated with the requested media content item.

One or more aspects of the subject disclosure include a media content server that: (a) receives from an end user device a request including: (i) an identification of a media content item (e.g., a video); and (ii) authentication information associated with a DVR, authentication information associated with a service subscriber and/or authentication information associated with the requested media content item; and (b) responsive to the request, sends back to the end user device the requested media content item.

Figure 1:
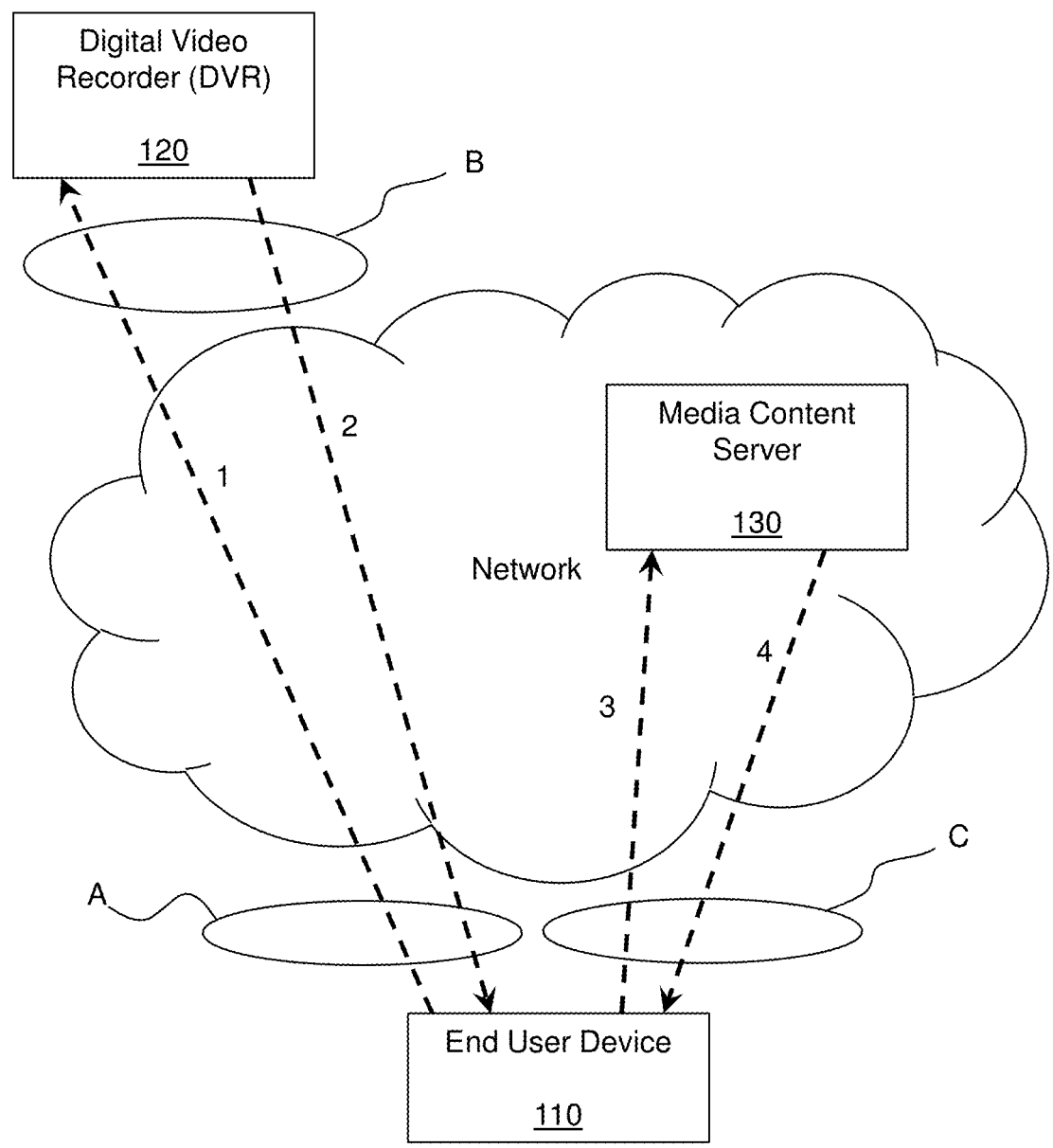
FIG. 1 depicts an illustrative embodiment of a system for distributing media content.

FIG. 1 depicts an illustrative embodiment of system 100 for distributing a media content item (e.g., a streaming video). As shown by dashed line 1, a first request for the media content item is sent from end user device 110 to DVR 120. This first request may be sent responsive to initiation by a user (e.g., via input to a graphical user interface of the end user device 110). This first request may be in the form of, for example, an electronic message, an electronic signal, an electronic instruction, and/or a file (e.g., a data file). In one example, this first request travels from end user device 110 to DVR 120 as follows: (1) via communication channel "A" (the portion of line 1 that is between end user device 110 and the network); (2) through the network (which may comprise, for example, the Internet); and (3) via communication channel "B" (the portion of line 1 that is between the network and the DVR 110). In one specific example, communication channel "A" may comprise a wireless portion and end user device 110 may comprise a mobile device such as a smartphone or tablet. In another specific example, communication channel "B" may comprise a wireless portion and/or a wired portion. In another specific example, a download bandwidth of communication channel "A" (that is, in a downstream direction from the network to the end user device 110) may be higher than an upload bandwidth of communication channel "B" (that is, in an upstream direction from the DVR 120 to the network).

Responsive to the first request being received by the DVR 120, the DVR 120 then sends a first response, as shown by dashed line 2, to end user device 110. This first response may be sent automatically by DVR 120 upon receipt of the first request. This first response may be in the form of, for example, an electronic message, an electronic signal, an electronic instruction, and/or a file (e.g., a data file). In one specific example, the data file is a metadata file comprising: (a) authentication information (including credentials associated with the DVR 120, credentials associated with a media content subscriber linked to the DVR 120, digital rights management (DRM) information associated with the DVR 120, and/or DRM information associated with the media content subscriber linked to the DVR 120); and/or (b) pointer information (e.g., an IP address of the media content server 130 where the requested media content item is located or hosted; and/or a domain name of the media content server 130 where the requested media content item is located or hosted). In one example, this first response travels from DVR 120 to end user device 110 as follows: (1) via communication channel "B" (the portion of line 1 that is between DVR 120 and the network); (2) through the network; and (3) via communication channel "A".

Responsive to the first response being received by the end user device 110 from the DVR 120, the end user device 110 then sends a second request, as shown by dashed line 3, to media content server 130 (this media content server may be, for example, "cloud-based" and may comprise one or more servers). In one specific example, this second request may be sent automatically by the end user device 110 to media content server 130 after receipt by the end user device 110 of the first response from DVR 120. In another specific example, this second request may be sent by the end user device 110 to media content server 130 in response to initiation by the user (such initiation by the user occurring after receipt by the end user device 110 of the first response from DVR 120). This initiation by the user may be, for example, via input to a graphical user interface of the end user device 110. This second request may be in the form of, for example, an electronic message, an electronic signal, an electronic instruction, and/or a file (e.g., a data file). In one example, this second request travels from end user device 110 to media content server 130 as follows: (1) via communication channel "C" (the portion of line 3 that is between end user device 110 and the network); and (2) through the network. In one specific example, communication channel "C" may comprise a wireless portion and end user device 110 may comprise a mobile device such as a smartphone or tablet. This second request is sent to the address (e.g., the IP address) specified in the metadata received by the end user device 110 from the DVR 120 (that is, the second request is sent to the address of the media content server 130 where the requested media content item is located or hosted). This second request may include an identification of the specific media content item being requested (e.g., a name of a video and/or an alphanumeric identifier of the video). This second request may include the authentication information specified in the metadata received by the end user device 110 from the DVR 120.

Responsive to the second request being received by the media content server 130, the media content server 130 then verifies the authentication information received from the end user device 110 in the second request. In one specific example, the media content server 130 verifies that the DVR 120 has access permission for the media content item requested by the second request (the verification may be performed, for example, by comparing the credential information of the metadata (which had also been included in the second request) to information in a database accessible by the media content server 130). In another specific example, the media content server 130 verifies that the subscriber linked to DVR 120 has access permission for the media content item requested by the second request (the verification may be performed, for example, by comparing the credential information of the metadata (which had also been included in the second request) to information in a database accessible by the media content server 130). In another specific example, the media content server 130 verifies based on the DRM information that the DVR 120 has rights to the media content item requested by the second request (the verification may be performed, for example, by comparing the DRM information of the metadata (which had also been included in the second request) to information in a database accessible by the media content server 130). In another specific example, the media content server 130 verifies based on the DRM information) that the subscriber linked to DVR 120 has rights to the media content item requested by the second request (the verification may be performed, for example, by comparing the DRM information of the metadata (which had also been included in the second request) to information in a database accessible by the media content server 130).

Responsive to the verification by the media content server 130 of the authentication information (e.g., the DVR 120 and/or the subscriber linked to DVR 120 having current rights to access the requested media content item), the media content server 130 sends (e.g., via streaming) the requested media content item (as shown by dashed line 4) to end user device 110 (where the media content item is output, such as via a display screen and/or one or more speakers of end user device 110). In one example, the requested media content item travels from media content server 130 to end user device 110 to as follows: (1) through the network; and (2) via communication channel "C". In one specific example, communication channel "C" may comprise a wireless portion and end user device 110 may comprise a mobile device such as a smartphone or tablet.

In another embodiment, instead of (or in addition to) the media content server 130 utilizing the DRM information, the end user device 110 may, such as upon receiving the requested media content item, perform a DRM process (to permit or deny viewing of the media content item).

Still referring to FIG. 1, in one specific example, a user viewing the requested media content item from media content server 130 using end user device 110 may be provided with "trick play" functionality (e.g., pause, rewind, fast forward). In another specific example, the requested media content item may be streamed and/or downloaded from media content server 130 to the end user device 110.

In another embodiment, some or all of the functions performed by DVR 120 may instead be performed by an STB connected to or integrated with DVR 120.

In another embodiment, rather than the end user device sending a first request to the DVR for a specific requested media content item, the end user device may send a first request for a playlist to the DVR. In this case, the DVR would then send a first response (including a metadata file with the playlist) back to the end user device. In one example, the playlist would identify a plurality of media content items that had been previously recorded by the DVR. Each media content item listed in the playlist may be identified by title and/or by a code (e.g., a unique alphanumeric code). The metadata file may comprise authentication information corresponding to each media content item in the playlist. In one specific example, the same authentication information (e.g., a single digital rights management key) may apply to all of the media content items in the playlist. In another specific example, distinct authentication information (e.g., a specific digital rights management key) may apply to each media content item in the playlist. The metadata file may further comprise a pointer such as a network address (e.g., IP address) of a media content server where each media content item listed in the playlist is located. In one specific example, the same pointer (e.g., a single IP address) may apply to all of the media content items in the playlist. In another specific example, a distinct pointer (e.g., a specific IP address) may apply to each media content item in the playlist. A desired media content item is then selected from the playlist by a user via the end user device (e.g., via a graphical user interface of the end user device). The selected media content item is then requested by the end user device from media content server at the corresponding address in a manner similar to that described above (e.g., in a second request sent via communication channel "C"). Further, the selected media content item is then sent back to the end user device from the media content server in a manner similar to that described above (e.g., the selected media content item is sent back via communication channel "C").

Figure 2:
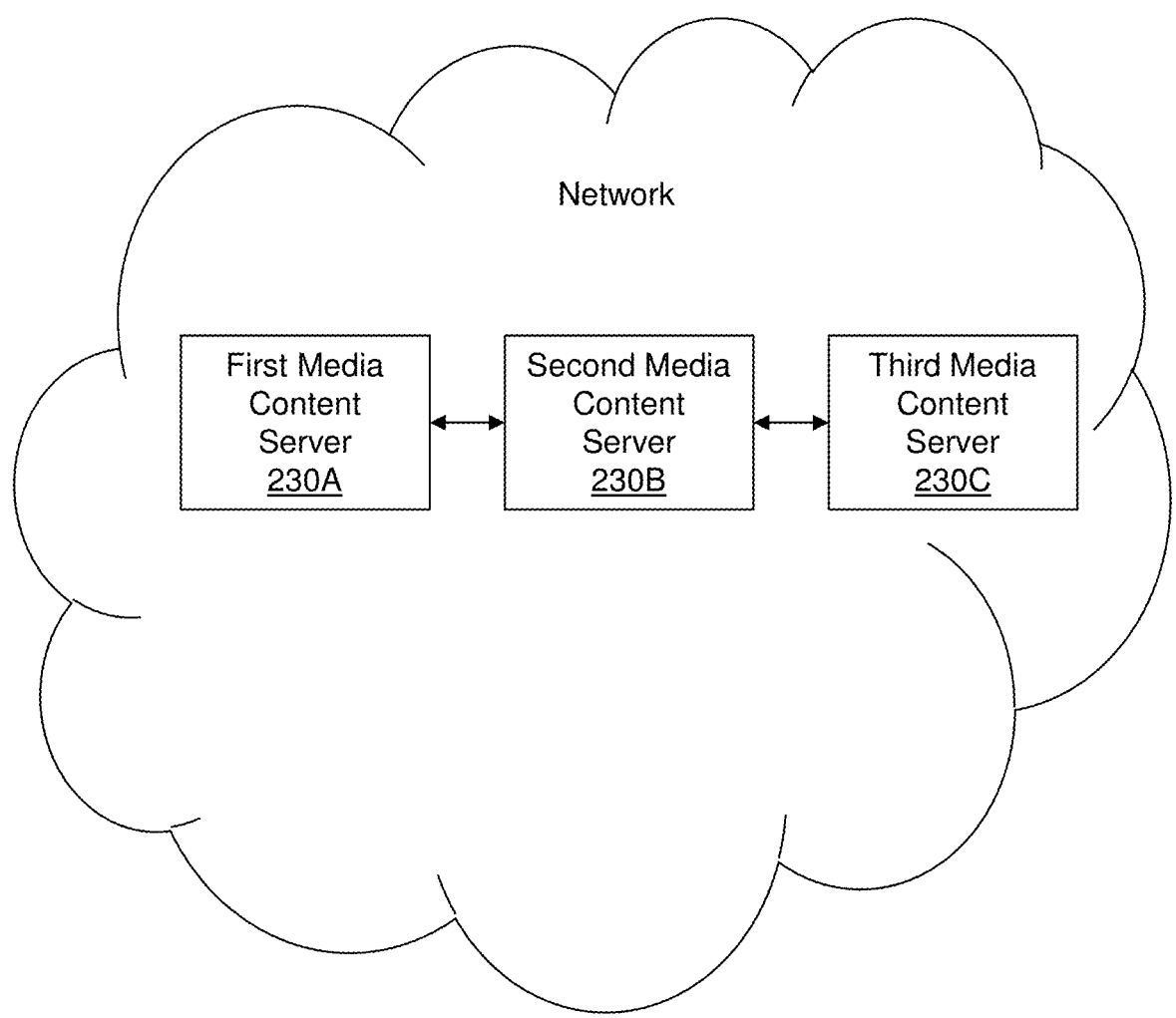
FIG. 2 depicts an illustrative embodiment of a system for distributing media content.

FIG. 2 depicts an illustrative embodiment of a system 200 for distributing media content. System 200 includes first media content server 230A, second media content server 230B and third media content server 230C (of course, while three media content servers are shown in this FIG. 2, any desired number of media content servers may be utilized). Each of first media content server 230A, second media content server 230B and third media content server 230C is in operative communication with one another via a network (e.g., the Internet). Each of first media content server 230A, second media content server 230B and third media content server 230C may store one or more media content items that have been recorded by a DVR (e.g., DVR 120 of FIG. 1). First media content server 230A may communicate (e.g., periodically and/or responsive to a change of information) with the DVR to provide the DVR the network address (or other pointer) of each media content item stored thereon. Second media content server 230B may communicate (e.g., periodically and/or responsive to a change of information) with the DVR to provide the DVR the network address (or other pointer) of each media content item stored thereon. Third media content server 230C may communicate (e.g., periodically and/or responsive to a change of information) to the DVR to provide the DVR the network address (or other pointer) of each media content item stored thereon. In addition, each of the first media content server 230A, the second media content server 230B and the third media content server 230C may communicate (e.g., periodically and/or responsive to a change of information) with each other to provide updated address information corresponding to the media content items stored thereon. In one example, the communication among the DVR, the first media content server 230A, the second media content server 230B and the third media content server 230C may be carried out over a network (e.g., the Internet). In another example, the network addresses (or other pointer) of the media content items may be dynamic (such as, for example, when a media content item is deleted from a given media content server, when a media content item is added to a media content server and/or when a media content item is moved from one media content server to another media content server). The updating of the network address (or other pointer) information among the DVR, the first media content server 230A, the second media content server 230B and the third media content server 230C may be triggered, for example, when there is such a dynamic change in network addresses or other pointers (e.g., when a media content item is deleted from a media content server, added to a media content server and/or moved between media content servers).

Figure 3A:
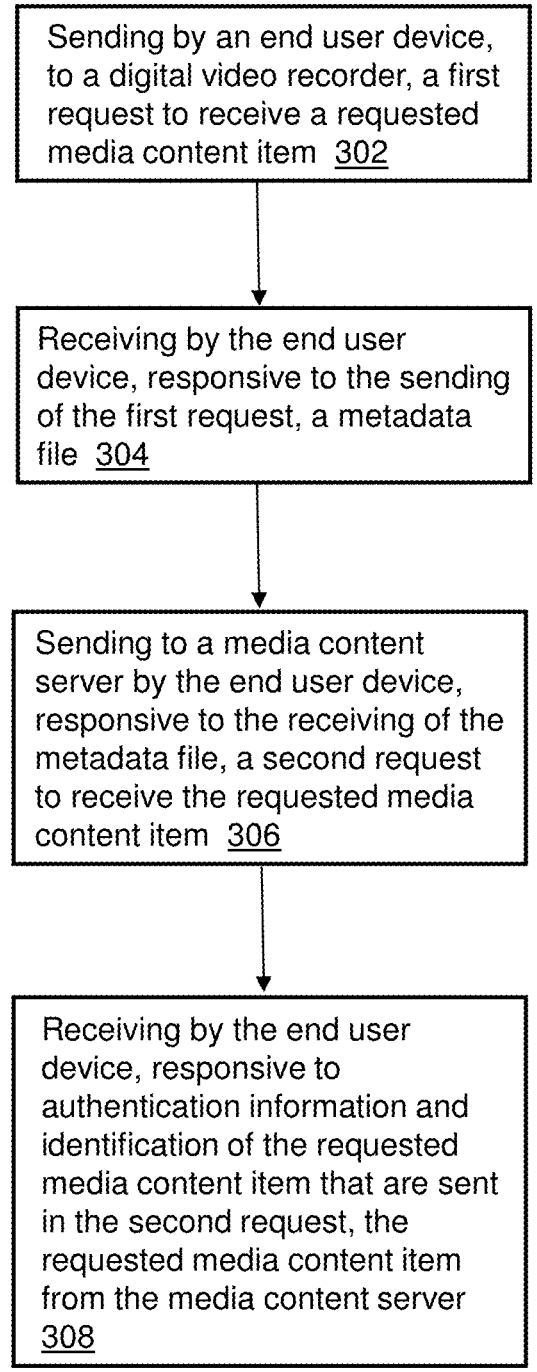
FIG. 3A depicts an illustrative embodiment of a method such as may be used in the systems (or portions of the systems) described in FIGS. 1 and/or 2.

FIG. 3A depicts an illustrative embodiment of a method used by system 100 of FIG. 1 and/or system 200 of FIG. 2. While for purposes of simplicity of explanation, the respective processes are shown and described as a series of blocks in FIG. 3A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 3A, method 300 begins at step 302 with sending by an end user device, to a digital video recorder, a first request to receive a requested media content item. In one example, the requested media content item had been previously recorded by the digital video recorder. In another example, the digital video recorder is distinct from the end user device. Method 300 then continues at step 304 with receiving by the end user device, responsive to the sending of the first request, a metadata file. In one example, the metadata file comprises authentication information and a network address of a media content server where the requested media content item is located, wherein the media content server is distinct from each of the digital video recorder and the end user device. Method 300 then continues at step 306 with sending to the media content server by the end user device, responsive to the receiving of the metadata file, a second request to receive the requested media content item. In one example, the second request is sent to the network address, contained in the metadata file, of the media content server where the requested media content item is located. In another example, the second request comprises the authentication information contained in the metadata file. In another example, the second request comprises an identification of the requested media content item (e.g., by title and/or by code, such as a unique alphanumeric code). Method 300 then continues at step 308 with receiving by the end user device, responsive to the authentication information and the identification of the requested media content item that are sent in the second request, the requested media content item from the media content server.

Figure 3B:
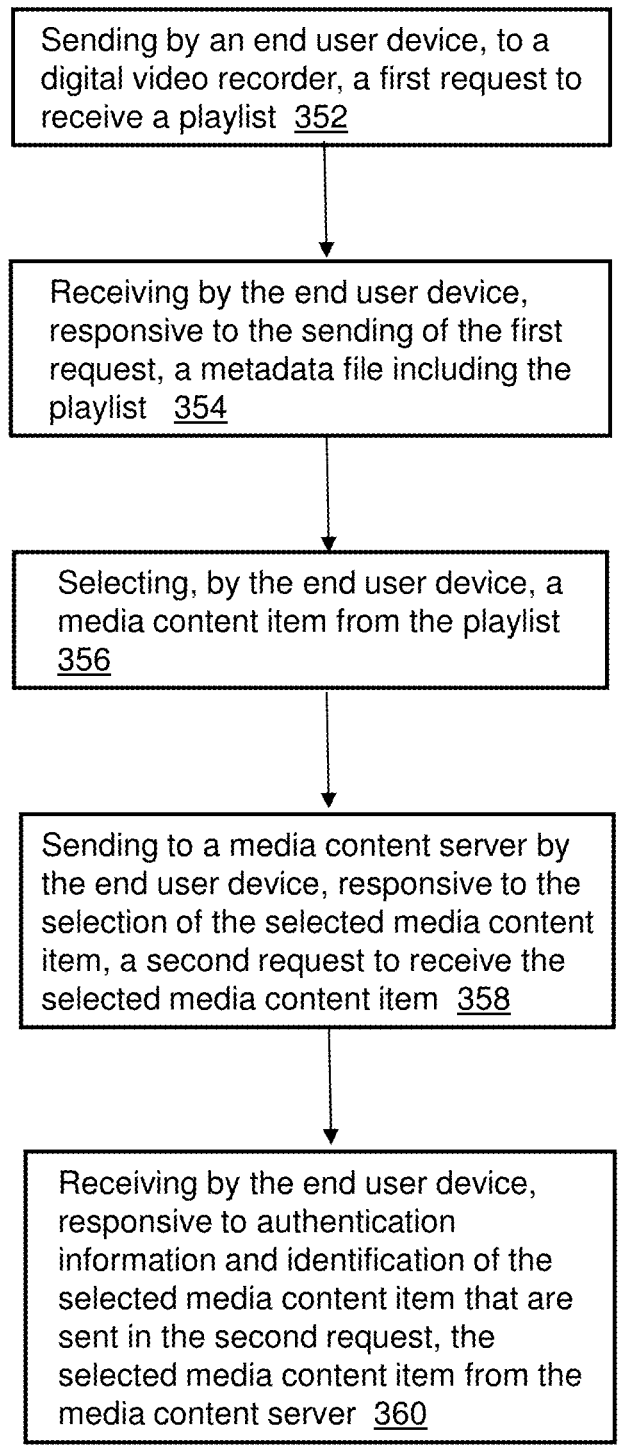
FIG. 3B depicts an illustrative embodiment of a method such as may be used in the systems (or portions of the systems) described in FIGS. 1 and/or 2.

FIG. 3B depicts another illustrative embodiment of a method used by system 100 of FIG. 1 and/or system 200 of FIG. 2. While for purposes of simplicity of explanation, the respective processes are shown and described as a series of blocks in FIG. 3B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 3B, method 350 begins at step 352 with sending by an end user device, to a digital video recorder, a first request to receive a playlist. Method 350 then continues at step 354 with receiving by the end user device, responsive to the sending of the first request, a metadata file including the playlist. In one example, the media content items listed in the playlist had been previously recorded by the digital video recorder. In another example, the metadata file comprises authentication information corresponding to each media content item in the playlist and a network address of a media content server where each media content item listed in the playlist is located. Method 350 then continues at step 356 with selecting, by the end user device, a media content item from the playlist. In one example, the selecting may be carried out by a user via a graphical user interface of the end user device. Method 350 then continues to step 358 with sending to the media content server by the end user device, responsive to the selection of the selected media content item, a second request to receive the selected media content item. In one example, the second request is sent to the network address, contained in the metadata file, of the media content server where the selected media content item is located. In another example, the second request comprises the authentication information (corresponding to the selected media content item) contained in the metadata file. In another example, the second request comprises an identification of the selected media content item (e.g., by title and/or by code, such as a unique alphanumeric code). Method 350 then continues at step 360 with receiving by the end user device, responsive to the authentication information and the identification of the selected media content item that are sent in the second request, the selected media content item from the media content server.

As described herein, an upload communication link (e.g., a DSL link to an access network) between a DVR and a network may have a lower bandwidth than a download link (e.g., comprising a mobility network) between an end user device and a media content server. By utilizing certain embodiments described herein, the DSL uplink bandwidth bottleneck can be avoided, and the streamed media content item can have higher resolution. In addition, in certain embodiments a quality of the streamed media content item is not affected by other traffic on the DSL connection.

In another example, the media content item may have been recorded (locally at the DVR and/or stored at the media content server) in a first format (e.g., a high definition format such as H264 (1080p)) and the recorded media content item may subsequently be provided to the end user device in the first format or in a second format that is different from the first format (e.g., the second format may be a lower resolution format such as H254; the second format may require a lower bandwidth connection (e.g., 512 kbps) than the bandwidth connection (e.g., above 512 kbps) required by the first format).

As described herein, in various embodiments the media content (e.g., video) is recorded and stored in media content server(s) on the network. The video title and DRM information are stored locally on the DVR (e.g., at a residence of a user). The video title information and the DRM for the video are obtained from the DVR and the obtained data is then used to stream or download the video content. The DRM information from the DVR may be used by the end user device to decode the video.

In another example, after the DVR receives the first request (to receive a requested media content item) from the end user device, the DVR then sends a communication to the media content server instructing the media content server to send the metadata file to the end user device.

In another example, after the DVR receives the first request (to receive a requested media content item) from the end user device, the DVR then sends a query to a primary media content server. The query asks the primary media content server to send back to the DVR the location of the requested media content item (the location may be on the primary media server or another media server identified by the primary media server). The primary media server then sends back the location in response to the query.

In another example, the media content may be encrypted on the network (e.g., as hosted on the media content server(s)) and decryption keys may be used to decrypt a given media content item. In one specific example, there is one distinct decryption key for a given media content item (e.g. a given video title). In another example, there is one master decryption key for a plurality of media content items (e.g. a one master key for all content associated with a given content provider or associated with a given DVR or associated with a given STB or associated with a given subscriber). In one specific example, the decryption key may control whether a given media content item can be accessed or viewed. In another specific example, the decryption key may control how many times a given media content item can be accessed or viewed.

In another example, each media content item may be associated with a distinct metadata file. In another example, authentication information for a given DVR (or STB) may comprise a serial number of the DVR (or STB). In one specific example, the serial number may provide a unique identification (e.g., a unique identification with respect to a given service provider). Such a serial number may be used to authenticate the DVR (or STB) with the service provider.

As described herein, various embodiments may in essence operate as a networked DVR system (e.g., each device can act as a DVR). In one example, various devices can be synchronized. In one specific example, the synchronization can be managed by a centralized mechanism (e.g. a central server). In another specific example, the synchronization may be push synchronization to a plurality of devices (e.g., all devices associated with a given subscriber, all devices identified in a profile of the subscriber, and/or all devices associated with a given DVR or STB). In another specific example, the synchronization may be controlled locally by the DVR and/or STB.

In another example, the media content item requested (or selected) by the end user device could have been scheduled by the DVR to be recorded at a future time (that is, not yet recorded at the time of the media content item request or media content item selection).

In another example, the media content item may be streamed to the end user device using dynamic adaptive streaming (DASH). In another example, the media content item may be streamed to the end user device using HTTP live streaming (HLS).

As described herein, various embodiments can optimize network storage. For example, a media content server may need to store only a single copy of a given media content item that had been recorded by a plurality of networked DVRs. In addition, various embodiments may provide flexibility with respect to customer recorded content management. For example, customer DVR recording metadata may be stored in a network database. The stored video content may be indexed by video clips. If two customers record the same video at different positions (partial recording) then the customer ID and the starting clip position and ending clip position may be stored in the network database. This allows flexible customer recorded content management. In another example, bookmarks (e.g., of videos recorded and/or viewed; of specific portions of videos recorded and/or viewed) may be shared by a user with family and/or friends (e.g., via a social network).

In one or more embodiments, the DVR and end user device can be of different subscribers and/or of different service providers. Various agreements can be put in place to enable sharing or otherwise media content items, such as a first user communicating via a mobile phone with a DVR of a second user and obtaining a media content item (stored in the DVR) from a media content server such as through use of metadata sent from the DVR. In this example, the first and second users can have different subscription agreements and/or can be subscribed to different service providers. In one or more embodiments, network conditions including traffic, time of day, and so forth, as well as parameters of the media content item (e.g., size) can be taken into consideration in determining whether the media content item should be delivered from the media content server and/or which server of a group of servers (e.g., located in distinct geographical areas) should be used for the delivery.

As described herein, various embodiments can utilize networked DVRs to support data analysis of customer behaviors. For example, the networked DVRs may store the customer recorded information across geographical area and/or over time.

In another embodiment, the end user device can cache/save the metadata (and/or the metadata file) for a period of time (e.g., a limited period time) in case the user wants to continue viewing the content (e.g., continue viewing the content after a short period of time). Such caching of the metadata (and/or the metadata file) can reduce a waiting time for the content to be displayed.

In another embodiment, the media content server can receive/store media content (e.g., video content) that has been uploaded by the subscriber DVR. In one example, a subscriber can receive video from a satellite dish, record the video received from the satellite dish, and then upload the recorded video to the media content server for viewing at a later time. In another example, a subscriber can receive video from a satellite dish, and then upload the received video (without recording) to the media content server for viewing at a later time.

Figure 4:
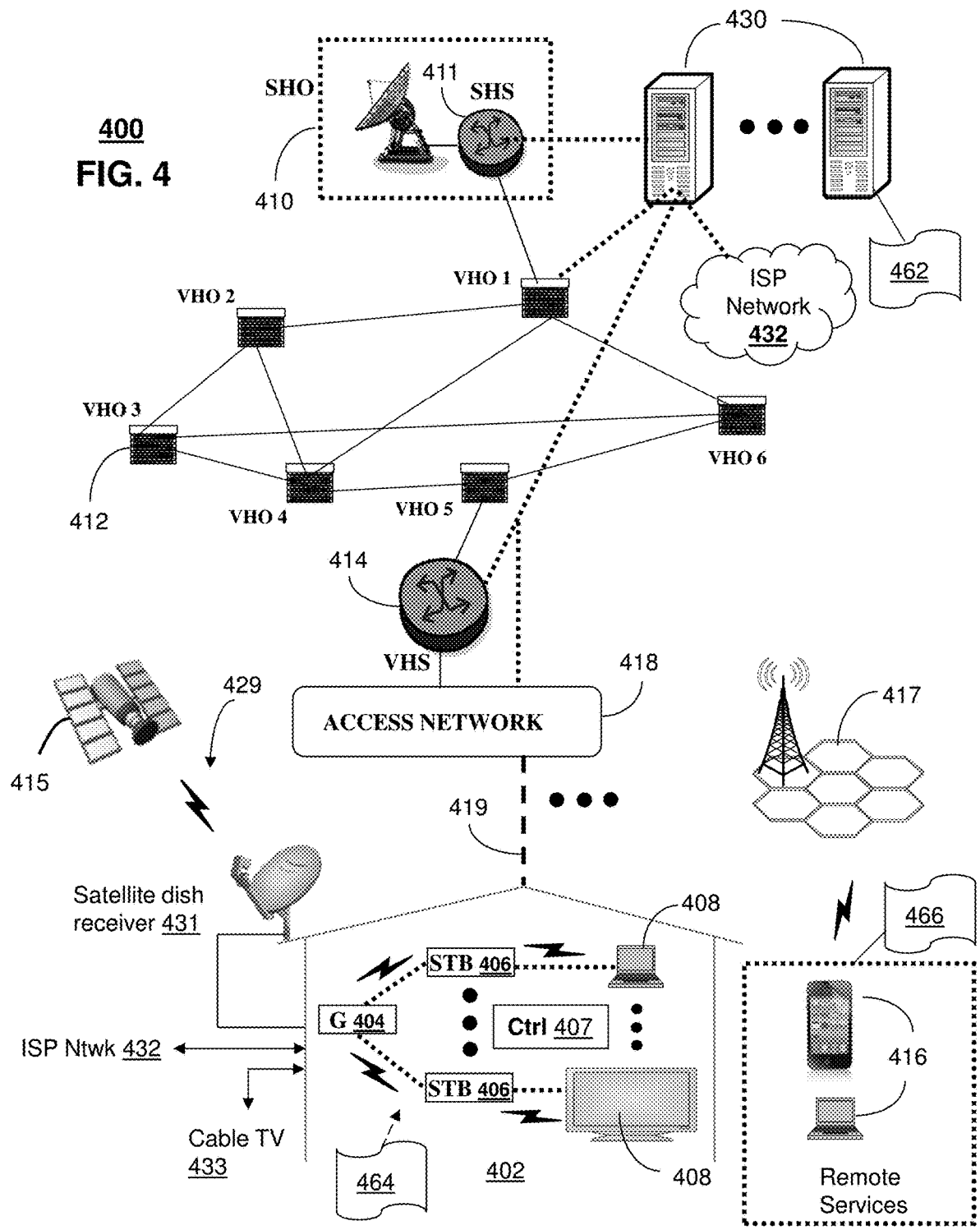
FIG. 4 depicts an illustrative embodiment of a communication system that provides media services including distribution of media content to an end user device (e.g., mobile device), such as described in connection with the embodiments of FIGS. 1, 2, 3A and 3B.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with system 100 of FIG. 1 and/or system 200 of FIG. 2 as another representative embodiment of communication system 400. For instance, one or more devices illustrated in the communication system 400 of FIG. 4 can function as the DVR that: (a) receives from the end user device a request for a media content item; and (b) responsive to the request, sends back to the end user device: (i) a network address of the media content server from which the requested media content item can be obtained; and (ii) authentication information associated with the DVR, a service subscriber and/or the requested media content item.

In another example, one or more devices illustrated in the communication system 400 of FIG. 4 can function as the end user device that: (a) sends to the DVR a request for a media content item; and (b) receives back from the DVR: (i) a network address of a media content server from which the requested media content item can be obtained; and (ii) authentication information associated with the DVR, a service subscriber and/or the requested media content item.

In another example, one or more devices illustrated in the communication system 400 of FIG. 4 can function as the media content server that: (a) receives from the end user device a request including: (i) an identification of a media content item; and (ii) authentication information associated with the DVR, a service subscriber and/or the requested media content item; and (b) responsive to the request, sends back to the end user device the requested media content item.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Such a web server may operate as and/or provide function(s) of the media content server of system 100 of FIG. 1. In another example, such a web server may operate as and/or provide function(s) of some or all of the first, second and third media content servers of system 200 of FIG. 2.

Communication system 400 can also provide for all or a portion of the computing devices 430 to function as a media content server (herein referred to as media content server 430). The media content server 430 can use computing and communication technology to perform function 462, which can include among other things, the media content item distribution techniques described by method 300 of FIG. 3A and/or method 350 of FIG. 3B. For instance, function 462 of server 430 can be similar to the functions described for the media content server 130 of FIG. 1 in accordance with method 300 and/or method 350. In another example, function 462 of server 430 can be similar to the functions described for the first media content server 230A, the second media content server 230B and/or the third media content server 230C of FIG. 2 in accordance with method 300 and/or method 350. The media processors 406 and wireless communication devices 416 can be provisioned with software functions 464 and 466, respectively, to utilize the services of media content server 430. For instance, functions 464 of media processors 406 can be similar to the functions described for DVR 120 of FIG. 1 in accordance with methods 300 and/or 350. In another example, functions 466 of wireless communication devices 416 can be similar to the functions described for end user device 110 of FIG. 1 in accordance with methods 300 and/or 350.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
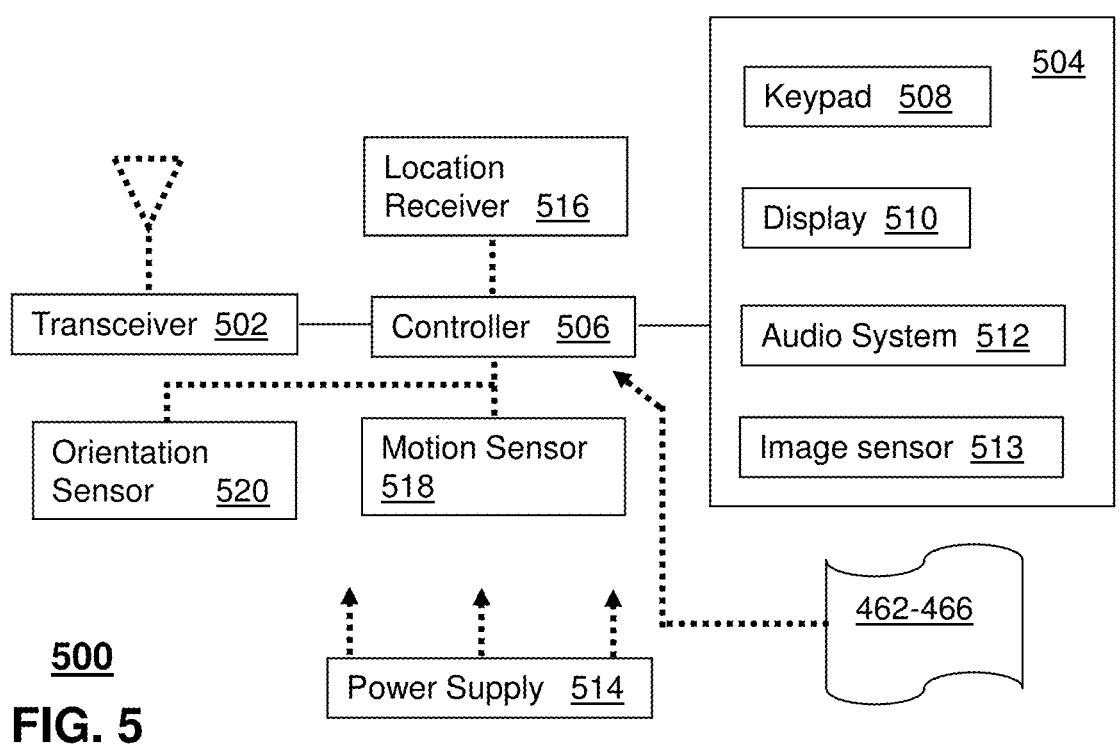
FIG. 5 depicts an illustrative embodiment of a communication device.

FIG. 5 depicts an illustrative embodiment of a communication device 500. Communication device 500 can serve in whole or in part as an illustrative embodiment of the devices depicted in FIGS. 1, 2 and/or 4 and can be configured to perform portions of (or all of) method 300 of FIG. 3A and/or method 350 of FIG. 3B.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of devices of FIGS. 1 and/or 2, the media processor 406, the media devices 408, or the portable communication devices 416 of FIG. 4. It will be appreciated that the communication device 500 can also represent other devices that can operate in system 100 of FIG. 1, system 200 of FIG. 2, communication system 400 of FIG. 4 and/or communication system 500 of FIG. 5 such as a gaming console and a media player. In addition, the controller 506 can be adapted in various embodiments to perform the functions 462-466.

Upon reviewing the aforementioned embodiments, it would be evident to an artisan with ordinary skill in the art that said embodiments can be modified, reduced, or enhanced without departing from the scope of the claims described below. For example, any desired number of end user device(s) may communicate with any desired number of DVR(s) and/or any desired number of media content server(s). Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
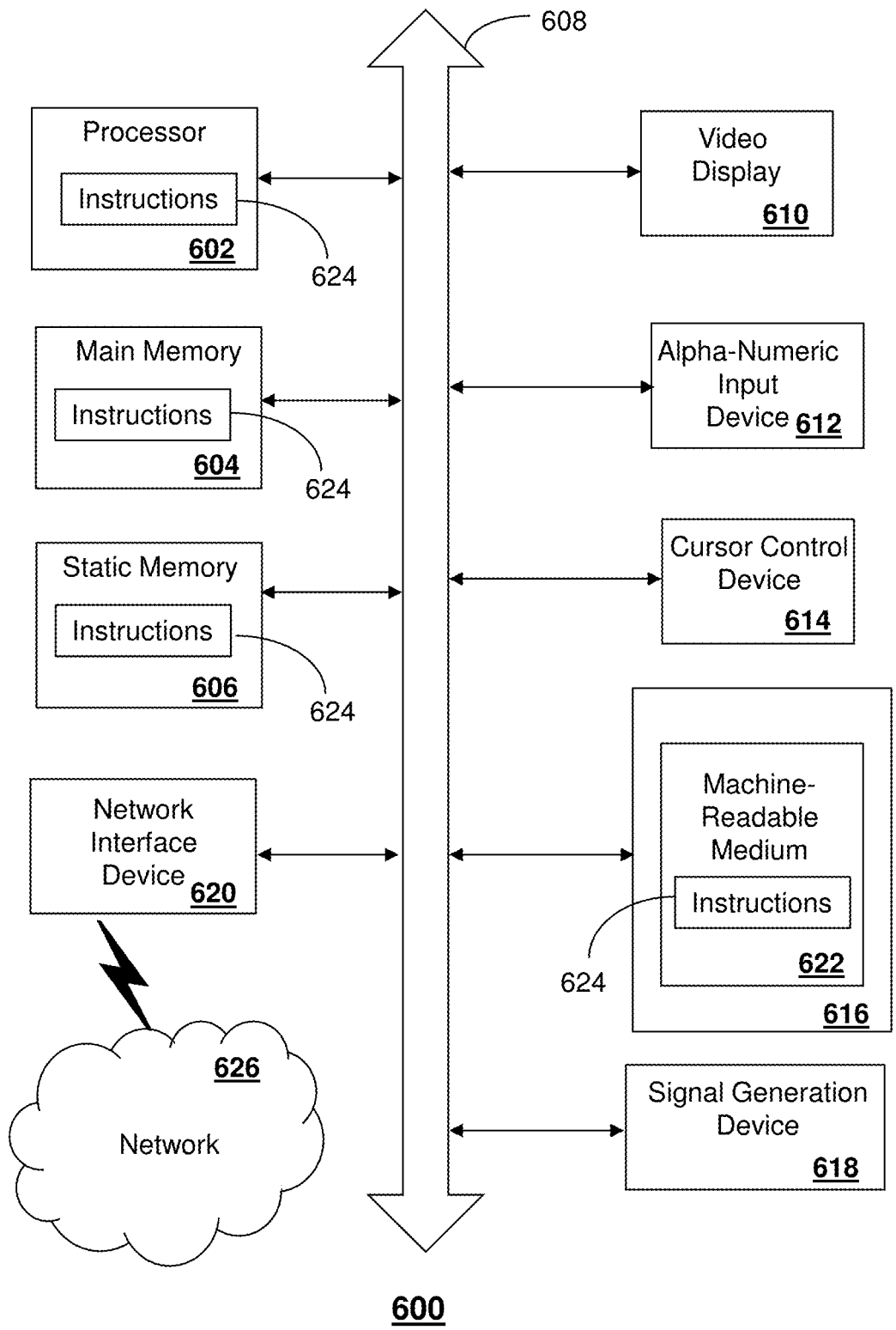
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the end user device 110, the DVR 120 and/or the media content server 130 FIG. 1. In another example, one or more instances of the machine can operate as first media content server 230A, second media content server 230B and/or third media content server 230C FIG. 2.

In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, by a processing system including a processor of a media content server having a network address, a media content request from a user device, the media content request comprising an identification of a media content item and authentication information associated with the media content item, the media content item having been previously recorded by a digital video recorder,
      wherein a metadata file received by the user device from the digital video recorder via a first communication channel includes the network address of the media content server,
      wherein the media content request is received via a second communication channel distinct from the first communication channel and not including the digital video recorder;
   determining, by the processing system using the authentication information, whether the authentication information is valid for the digital video recorder; and
   responsive to determining that the authentication information is valid for the digital video recorder, sending, by the processing system, the media content item to the user device via the second communication channel,
      wherein the authentication information comprises credential information and digital rights management information, the credential information including unique identification information of the digital video recorder and unique identification information of a subscriber to a service that delivers media content to the digital video recorder.

2. The method of claim 1, wherein the metadata file is received by the user device in response to a request sent by the user device to the digital video recorder for the media content item.

3. The method of claim 2, wherein the media content request is sent to the processing system automatically upon receipt by the user device of the metadata file.

4. The method of claim 1, wherein the media content request is sent to the processing system in accordance with input to a graphical user interface of the user device.

5. The method of claim 1, wherein the user device presents the media content item sent by the processing system by displaying the media content item on a display of the user device, outputting the media content item via a speaker of the user device, or any combination thereof.

6. The method of claim 1, wherein the digital video recorder is located at a residence of a subscriber to a service that delivers media content to the digital video recorder.

7. The method of claim 1, wherein the user device is configured to cache information from the metadata file for a period of time.

8. The method of claim 1, further comprising:
   synchronizing, by the processing system, the metadata file among the user device, the digital video recorder and the media content server.

9. The method of claim 8, wherein the synchronizing is performed periodically.

10. The method of claim 8, wherein the synchronizing is performed in response to a change, from a prior version of the metadata file, to a current version of the metadata file at one of the user device, the digital video recorder or the media content server.

11. A device comprising:
    a processing system including a processor of a media content server having a network address; and
    a memory storing executable instructions that, when executed by the processing system, facilitate performance of operations comprising:
    receiving a media content request from a user device, the media content request comprising an identification of a media content item and authentication information associated with the media content item, the media content item having been previously recorded by a digital video recorder,
       wherein a metadata file including the network address is received by the user device from the digital video recorder via a first communication channel in response to a request sent to the digital video recorder,
       wherein the media content request is received via a second communication channel distinct from the first communication channel and not including the digital video recorder;
    determining, by the processing system using the authentication information, whether the authentication information is valid for the digital video recorder; and
    responsive to determining that the authentication information is valid for the digital video recorder, sending, by the processing system, the media content item to the user device via the second communication channel,
       wherein the authentication information comprises credential information and digital rights management information, the credential information including unique identification information of the digital video recorder and unique identification information of a subscriber to a service that delivers media content to the digital video recorder.

12. The device of claim 11, wherein the media content request is sent to the processing system automatically upon receipt by the user device of the metadata file.

13. The device of claim 11, wherein the user device is configured to cache information from the metadata file for a period of time.

14. The device of claim 11, wherein the operations further comprise synchronizing the metadata file among the user device, the digital video recorder and the media content server.

15. The device of claim 14, wherein the synchronizing is performed in response to a change, from a prior version of the metadata file, to a current version of the metadata file at one of the user device, the digital video recorder or the media content server.

16. A non-transitory machine-readable medium comprising executable instructions that, when executed by a processing system including a processor of a media content server having a network address, facilitate performance of operations comprising:

receiving a media content request from a user device, the media content request comprising an identification of a media content item and authentication information associated with the media content item, the media content item having been previously recorded by a digital video recorder, wherein a metadata file including the network address is received by the user device from the digital video recorder via a first communication channel in response to a request sent by the user device to the digital video recorder, wherein the media content request is sent by the user device automatically on receipt by the user device of the metadata file;

wherein the media content request is received via a second communication channel distinct from the first communication channel and not including the digital video recorder;

determining, by the processing system using the authentication information, whether the authentication information is valid for the digital video recorder; and responsive to determining that the authentication information is valid for the digital video recorder, sending, by the processing system, the media content item to the user device via the second communication channel, wherein the authentication information comprises credential information and digital rights management information, the credential information including unique identification information of the digital video recorder and unique identification information of a subscriber to a service that delivers media content to the digital video recorder.

17. The non-transitory machine-readable medium of claim 16, wherein the media content item, having been previously recorded by the digital video recorder, is stored locally at the digital video recorder.

18. The non-transitory machine-readable medium of claim 16, wherein the user device is configured to cache information from the metadata file for a period of time.

19. The non-transitory machine-readable medium of claim 16, wherein the operations further comprise synchronizing the metadata file among the user device, the digital video recorder and the media content server.

20. The non-transitory machine-readable medium of claim 19, wherein the synchronizing is performed in response to a change, from a prior version of the metadata file, to a current version of the metadata file at one of the user device, the digital video recorder or the media content server.

* * * * *